United States Patent
Ueno et al.

(10) Patent No.: US 12,504,304 B2
(45) Date of Patent: Dec. 23, 2025

(54) DETECTION DEVICE AND STEERING DEVICE

(71) Applicant: Hitachi Astemo, Ltd., Hitachinaka (JP)

(72) Inventors: Takayuki Ueno, Hitachinaka (JP); Makoto Murata, Hitachinaka (JP); Ryo Watanabe, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 652 days.

(21) Appl. No.: 17/941,575

(22) Filed: Sep. 9, 2022

(65) Prior Publication Data

US 2023/0003556 A1 Jan. 5, 2023

Related U.S. Application Data (63) Continuation of application No. PCT/JP2020/017013, filed on Apr. 20, 2020.

(51) Int. Cl.
*G01D 5/20* (2006.01)
*B62D 5/04* (2006.01)
*G01D 5/244* (2006.01)

(52) U.S. Cl.
CPC ....... *G01D 5/24457* (2013.01); *B62D 5/0484* (2013.01)

(58) Field of Classification Search
CPC .. G01D 5/24457; B62D 5/0484; B62D 5/049; B62D 5/0463; G01L 3/10; G01L 25/00
See application file for complete search history.

(56) References Cited

U.S. PATENT DOCUMENTS

| | | | | |
|---|---|---|---|---|
| 4,727,950 A | * | 3/1988 | Shimizu | B62D 5/0469 |
| | | | | 180/446 |
| 9,975,572 B2 | * | 5/2018 | Sasaki | B62D 5/0493 |
| 10,850,769 B2 | * | 12/2020 | Asaka | G01D 5/12 |
| 11,390,318 B2 | * | 7/2022 | Nakamura | B62D 5/049 |
| 11,465,683 B2 | * | 10/2022 | Kozawa | B62D 5/0484 |
| 2002/0033301 A1 | * | 3/2002 | Clephas | B62D 5/006 |
| | | | | 180/446 |
| 2015/0360715 A1 | * | 12/2015 | Shimizu | B62D 5/0484 |
| | | | | 701/43 |
| 2016/0332660 A1 | * | 11/2016 | Sasaki | B62D 5/046 |
| 2017/0015348 A1 | * | 1/2017 | Sasaki | B62D 6/00 |
| 2017/0305455 A1 | * | 10/2017 | Hisanaga | B62D 5/0493 |

(Continued)

FOREIGN PATENT DOCUMENTS

| | | |
|---|---|---|
| JP | 2008226222 A | 9/2008 |
| JP | 2014210472 A | 11/2014 |

(Continued)

OTHER PUBLICATIONS

International Search Report mailed Jul. 14, 2020 for the corresponding PCT International Patent Application No. PCT/JP2020/017013 ( 2 pages ).

*Primary Examiner* — Zakaria Elahmadi
(74) *Attorney, Agent, or Firm* — Leason Ellis LLP; Edward J. Ellis; Melvin C. Garner (57) ABSTRACT

A detection device includes: a plurality of sensors configured to detect a value to be detected; and a processing section configured to process a detection signal output from each of the plurality of sensors. A periodicity with which one or some of the plurality of sensors output detection signals is shorter than a periodicity with which others of the plurality of sensors output detection signals.

4 Claims, 10 Drawing Sheets

(56) References Cited

U.S. PATENT DOCUMENTS

| | | | | |
|---|---|---|---|---|
| 2020/0180685 A1* | 6/2020 | Suzuki | ............. | B62D 5/0412 |
| 2020/0180689 A1* | 6/2020 | Asaka | ............. | G01D 3/08 |
| 2020/0198690 A1* | 6/2020 | Kurihara | ............. | G01L 3/10 |
| 2020/0207408 A1* | 7/2020 | Nakamura | ............. | B62D 5/049 |
| 2021/0269087 A1* | 9/2021 | Zhao | ............. | B62D 5/0484 |

FOREIGN PATENT DOCUMENTS

| | | | | |
|---|---|---|---|---|
| JP | 6283737 | B2 | 2/2018 | |
| JP | 2018095223 | A | 6/2018 | |
| WO | WO-2015198034 | A1 * | 12/2015 | ......... B62D 15/0215 |
| WO | 2018008628 | A1 | 1/2018 | |

* cited by examiner

DETECTION DEVICE AND STEERING DEVICE

CROSS REFERENCE TO RELATED APPLICATIONS

This application is a continuation of International Patent Application No. PCT/JP2020/017013 filed on Apr. 20, 2020, the content of which is incorporated herein by reference in its entirety.

FIELD OF THE INVENTION

The present invention relates to a detection device and a steering device.

BACKGROUND OF THE INVENTION

In recent years, a technique has been proposed that allows a steering assist function to be preserved even in the event of an abnormality occurring in sensor output signals. For example, a power steering device disclosed in Japanese Patent No. 6283737 is configured as follows. Specifically, the power steering device includes: at least two redundant steering torque sensors, at least two redundant steering angle sensors, and at least two redundant motor rotational position sensors, where, in a normal state, steering assist control is performed based on a steering torque detection signal from one of the at least two steering torque sensors, a steering angle detection signal from one of the at least two steering angle sensors, and a motor rotational position detection signal from one of the at least two motor rotational position sensors. Redundant monitoring is performed between the at least two steering torque sensors, between the at least two steering angle sensors, and between the at least two motor rotational position sensors, and upon detection of an abnormality in any sensor output signal during the redundant monitoring, the abnormal signal is switched to an alternative signal.

CITATION LIST

Patent Literature

Patent Literature 1: Japanese Patent No. 6283737

Technical Problem

Sensors used in electric power steering devices have increasingly been required to be redundant from the safety perspective. However, meeting such a demand would involve increased processing load on a device that processes sensor detection signals, such as needing to detect a failure in sensors with redundancy.

An object of the present invention is to provide a detection device and the like that can reduce the processing load on a device that processes detection signals from sensors with redundancy.

SUMMARY OF THE INVENTION

Solution to Problem

According to an aspect, a detection device is provided. The detection device includes: a plurality of sensors configured to detect a value to be detected; and a processing section configured to process a detection signal output from each of the plurality of sensors. A periodicity with which one or some of the plurality of sensors output detection signals is shorter than a periodicity with which others of the plurality of sensors output detection signals.

The plurality of sensors may include at least four sensors, and the one or some of the plurality of sensors may be two sensors of the at least four sensors.

The processing section may be configured to use detection signals from the two sensors to diagnose whether the two sensors are normal and, upon diagnosing the two sensors as being normal, output a detection signal from one of the two sensors as a signal indicative of the value to be detected.

The processing section may be configured to, upon diagnosing at least one of the two sensors as not being normal, output a detection signal from one of the others of the sensors as a detection signal indicative of the value to be detected.

An amount of information transmitted in each of detection signals from the two sensors may be larger than an amount of information transmitted in each of detection signals from the others of the sensors.

Alternatively, the plurality of sensors may include at least four sensors, and the one or some of the plurality of sensors may be one sensor of the at least four sensors.

The processing section may be configured to use a detection signal from the one sensor and a detection signal from a certain sensor of the others of the sensors to diagnose whether the one sensor and the certain sensor are normal and, upon diagnosing the one sensor and the certain sensor as being normal, output the detection signal from the one sensor as a detection signal indicative of the value to be detected.

The processing section may be configured to, upon diagnosing at least one of the one sensor and the certain sensor as not being normal, output a detection signal from a sensor of the others of the sensors other than the certain sensor as a detection signal indicative of the value to be detected.

An amount of information transmitted in a detection signal from the one sensor may be larger than an amount of information transmitted in each of detection signals from the others of the sensors.

According to another aspect of the present disclosure, a detection device is provided. The detection device includes: a plurality of sensors configured to detect a value to be detected; and a processing section configured to process a detection signal output from each of the plurality of sensors. An amount of information transmitted in each of detection signals from one or some of the plurality of sensors is larger than an amount of information transmitted in each of detection signals from others of the plurality of sensors.

According to still another of the present disclosure, a steering device is provided. The steering device includes: the detection device according to any one of the above aspects; and a control section configured to control actuation of an electric motor using values detected by the detection device.

Advantageous Effects of Invention

The present invention can reduce the processing load on a device processes detection signals from sensors with redundancy.

DETAILED DESCRIPTION OF THE INVENTION

Embodiments of the present invention will be described below in detail with reference to the attached drawings.

First Embodiment

Figure 1:
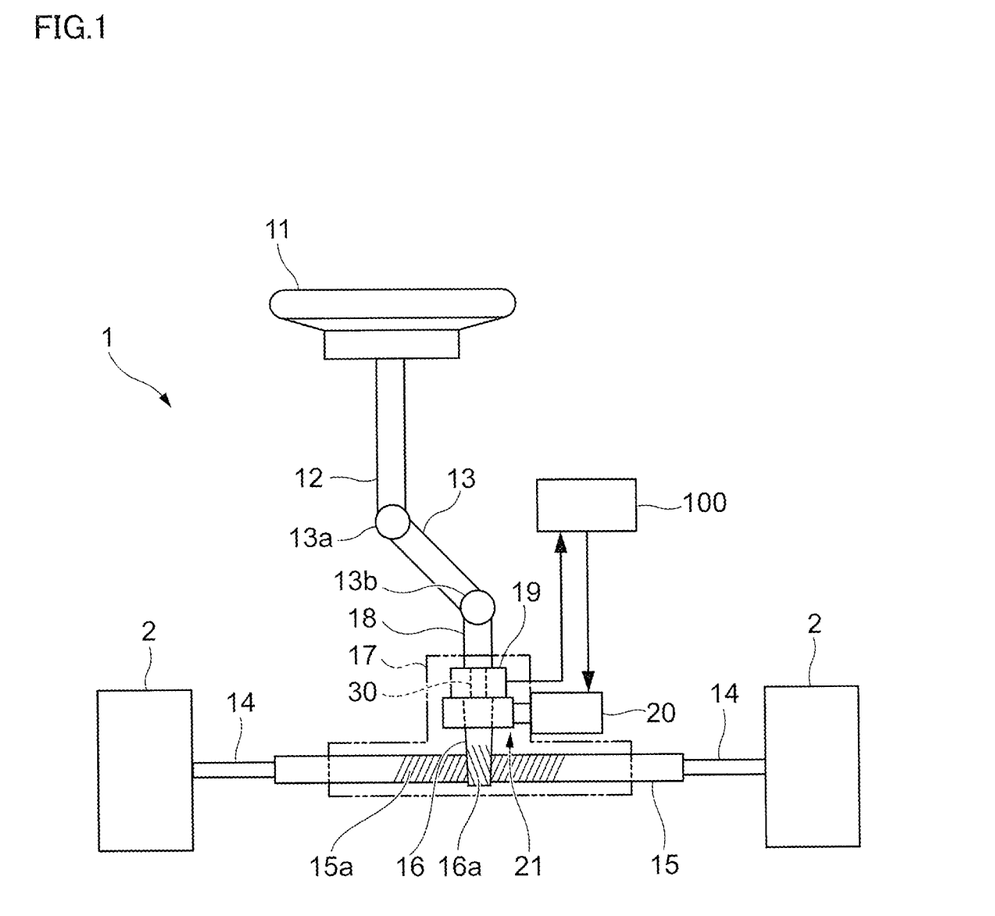
FIG. 1 illustrates an example schematic configuration of an electric power steering device according to a first embodiment.

FIG. 1 illustrates an example schematic configuration of an electric power steering device 1 according to the first embodiment.

The electric power steering device 1 (hereinafter may be simply referred to as a "steering device 1") is a steering device to change a traveling direction of a vehicle to any direction. By way of example, the steering device 1 of the present embodiment is used in an automobile, which is an example of the vehicle. FIG. 1 illustrates the automobile when viewed from the front.

The steering device 1 includes a steering wheel 11 operated by a driver to change a traveling direction of the automobile, and a steering shaft 12 integral with the steering wheel 11. The steering device 1 further includes an upper coupling shaft 13 coupled with the steering shaft 12 via a universal joint 13a, and a lower coupling shaft 18 coupled with the upper coupling shaft 13 via a universal joint 13b. The lower coupling shaft 18 rotates along with rotation of the steering wheel 11.

The steering device 1 further includes tie rods 14 respectively coupled with right and left front wheels 2 as rolling wheels, and a rack shaft 15 coupled with the tie rods 14. The steering device 1 further includes a pinion shaft 16 formed with a pinion 16a that constitutes a rack and pinion mechanism with rack teeth 15a formed on the rack shaft 15.

The steering device 1 further includes a gearbox 17 covering the rack teeth 15a and the pinion 16a. Within the gearbox 17, the pinion shaft 16 is coupled with the lower coupling shaft 18 via a torsion bar 30. Also, a sensor unit 19 is located within the gearbox 17. The sensor unit 19 detects steering torque applied to the steering wheel 11 based on a relative rotational angle between the lower coupling shaft 18 and the pinion shaft 16, or in other words, based on a torsion amount of the torsion bar 30.

The steering device 1 further includes an electric motor 20 supported by the gearbox 17, and a reducer mechanism 21 that reduces rotation of the electric motor 20 before transmitting it to the lower coupling shaft 18.

The steering device 1 further includes a controller 100 to control actuation of the electric motor 20. The controller 100 receives output signals from the sensor unit 19 described above.

Figure 2:
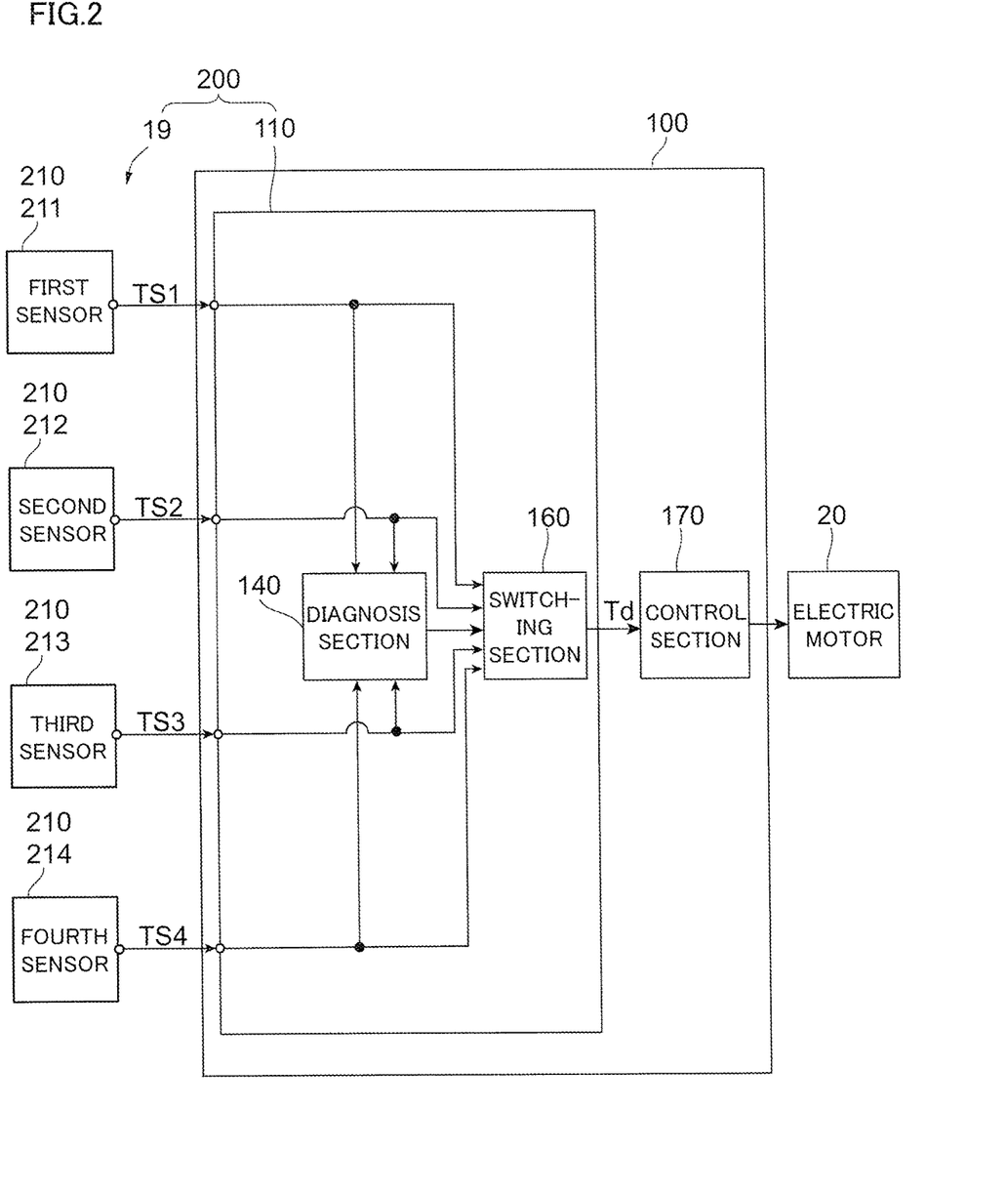
FIG. 2 illustrates example schematic configurations of a sensor unit and a controller.

FIG. 2 illustrates example schematic configurations of the sensor unit 19 and the controller 100.

The controller 100 is an arithmetic logical unit composed of a CPU, a ROM, a RAM, an electrically erasable programmable read-only memory (EEPROM), and the like.

The controller 100 includes a processing section 110 to process output signals from the sensor unit 19, and a control section 170 to control actuation of the electric motor 20 based on signals output from the processing section 110.

The processing section 110 constitutes, together with the sensor unit 19, a detection device 200 to detect steering torque. The detection device 200 will be detailed below.

The control section 170 sets a target current to be supplied to the electric motor 20 and performs feedback control such that an actual detected current supplied to the electric motor 20 matches the target current.

(Detection Device 200)

[Sensor Unit 19]

The sensor unit 19 includes a first sensor 211, a second sensor 212, a third sensor 213, and a fourth sensor 214. Configurations of the first sensor 211, the second sensor 212, the third sensor 213, and the fourth sensor 214 are basically the same except for aspects detailed below. Hereinafter, the first sensor 211, the second sensor 212, the third sensor 213, and the fourth sensor 214 may be collectively referred to as sensors 210 unless the distinction is needed.

By way of example, each of the first sensor 211, the second sensor 212, the third sensor 213, and the fourth sensor 214 may be implemented by a Hall IC having a first magnetic sensor, a second magnetic sensor, a third magnetic sensor, and a fourth magnetic sensor that is disclosed in Japanese Patent Application Laid-Open Publication No. 2018-095223 filed by Applicant. In other words, each sensor 210 integrates a Hall element (not shown) and an operational amplifier (not shown), where the Hall element is configured to detect a magnetic flux density in a magnetic circuit formed by a magnet (not shown) attached to the lower coupling shaft 18 and a yoke (not shown) secured to the pinion shaft 16. The sensor 210 amplifies a Hall voltage output from the Hall element and performs signal processing to output a signal corresponding to the magnetic flux density.

Hereinafter, a detection signal output from the first sensor 211 is referred to as a "first signal TS1," and a detection signal output from the second sensor 212 is referred to as a "second signal TS2." Also, a detection signal output from the third sensor 213 is referred to as a "third signal TS3," and a detection signal output from the fourth sensor 214 is referred to as a "fourth signal TS4." The first signal TS1, the second signal TS2, the third signal TS3, and the fourth signal TS4 may be collectively referred to as signals TS unless the distinction is needed.

[Processing Section 110]

The processing section 110 includes a diagnosis section 140 to diagnose a fault in the first sensor 211, the second sensor 212, the third sensor 213, and the fourth sensor 214. The processing section 110 further includes a switching section 160 to switch between using the first signal TS1 output from the first sensor 211 and using the third signal TS3 output from the third sensor 213 for use as a torque signal Td.

<<Diagnosis Section 140>>

The diagnosis section 140 receives input of the first signal TS1, the second signal TS2, the third signal TS3, and the fourth signal TS4.

Using the first signal TS1 and the second signal TS2, the diagnosis section 140 diagnoses whether both of the first sensor 211 and the second sensor 212 are normal or the first sensor 211 or the second sensor 212 is having a fault.

Using the third signal TS3 and the fourth signal TS4, the diagnosis section 140 also diagnoses whether both of the third sensor 213 and the fourth sensor 214 are normal or the third sensor 213 or the fourth sensor 214 is having a fault.

<<Switching Section 160>>

In response to the diagnosis section 140 diagnosing both of the first sensor 211 and the second sensor 212 as not having any fault, the switching section 160 outputs, as the torque signal Td, the first signal TS1 output from the first sensor 211.

In response to the diagnosis section 140 diagnosing the first sensor 211 or the second sensor 212 as having a fault and diagnosing both of the third sensor 213 and the fourth sensor 214 as not having any fault, the switching section 160 outputs, as the torque signal Td, the third signal TS3 output from the third sensor 213.

In response to the diagnosis section 140 diagnosing the first sensor 211 or the second sensor 212 as having a fault and diagnosing the third sensor 213 or the fourth sensor 214 as having a fault, the switching section 160 outputs a signal indicative of such a fault.

A communication scheme between the controller 100 and the first sensor 211, the second sensor 212, the third sensor 213, and the fourth sensor 214 is described below.

As described above, the first sensor 211, the second sensor 212, the third sensor 213, and the fourth sensor 214 output the first signal TS1, the second signal TS2, the third signal TS3, and the fourth signal TS4, respectively, to the controller 100. Hereinafter, a periodicity with which the first sensor 211 outputs the first signal TS1, a periodicity with which the second sensor 212 outputs the second signal TS2, a periodicity with which the third sensor 213 outputs the third signal TS3, and a periodicity with which the fourth sensor 214 outputs the fourth signal TS4 may be referred to as a first periodicity, a second periodicity, a third periodicity, and a fourth periodicity, respectively.

For the detection device 200 according to the first embodiment, the first to fourth signals TS1-TS4 transmit the same amount of information, which is, e.g., 12 bits or 16 bits.

Figure 3:
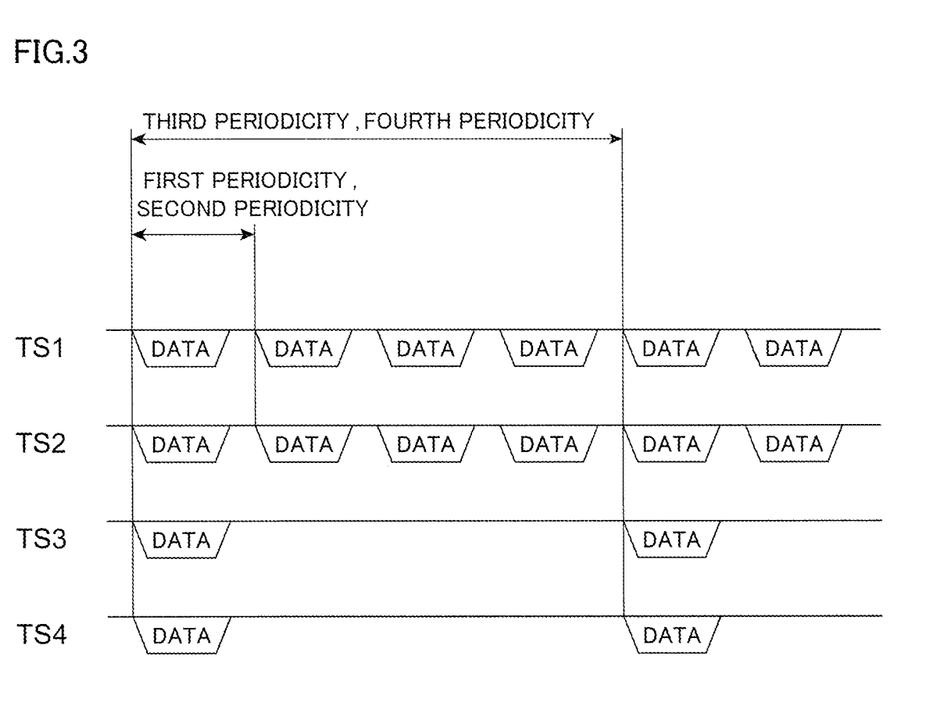
FIG. 3 illustrates examples of a first periodicity, a second periodicity, a third periodicity, and a fourth periodicity according to the first embodiment.

FIG. 3 illustrates examples of the first periodicity, the second periodicity, the third periodicity, and the fourth periodicity according to the first embodiment.

For the detection device 200 according to the first embodiment, the first and second periodicities are the same, and the third and fourth periodicities are the same and longer than the first and second periodicities. By way of example, the third and fourth periodicities may be an integer multiple of the first and second periodicities. In one example, when the first and second periodicities are each 1 msec, the third and fourth periodicities may be each 2 msecs, 3 msecs, 4 msecs, or 5 msecs. In another example, when the first and second periodicities are each 0.5 msecs, the third and fourth periodicities may be each 1 msec, 1.5 msecs, 2 msecs, or 2.5 msecs.

In such cases, the diagnosis section 140 of the controller 100 acquires the first and second signals TS1, TS2 with the first periodicity and diagnoses the health of the first and second sensors 211, 212 with the first periodicity. Meanwhile, the diagnosis section 140 acquires the third and fourth signals TS3, TS4 with the third periodicity and diagnoses the health of the third and fourth sensors 213, 214 with the third periodicity.

The switching section 160 outputs the first signal TS1 as the torque signal Td with the first periodicity while the first and second sensors 211, 212 are diagnosed as being normal.

As described above, the detection device 200 includes the first to fourth sensors 211-214, which are examples of the plurality of sensors, to detect the steering torque (the value to be detected) applied to the steering wheel 11, and the processing section 110 to process the first to fourth signals TS1-TS4, which are examples of the detection signals, respectively output from the first to fourth sensors 211-214. For the detection device 200, the first periodicity with which the signals TS are output from the first and second sensors 211, 212, which are examples of one or some sensors, of the first to fourth sensors 211-214 is shorter than the third periodicity with which the signals TS are output from the third and fourth sensors 213, 214, which are examples of other sensors, of the first to fourth sensors 211-214.

The thus configured detection device 200 reduces the processing load on the processing section 110 as compared to when the first to fourth periodicities are all set to have the same duration as the first periodicity and the processing section 110 of the controller 100 diagnoses the health of the first and second sensors 211, 212 as well as the health of the third and fourth sensors 213, 214 with the first periodicity. Advantageously, this reduces the processing load on the controller 100 even when a faster communication cycle is implemented between the sensor 210 and the controller 100 to provide better steering feel from the steering device 1.

Such a configuration still allows for control of actuation of the electric motor 20 using the third signal TS3 from the third sensor 213 even in the event of any fault in the first sensor 211 or the second sensor 212. Thus, the above configuration does not compromise the safety of the steering device 1.

In the first embodiment described above, the switching section 160 outputs the first signal TS1 output from the first sensor 211 as the torque signal Td in response to the diagnosis section 140 diagnosing the first and second sensors 211, 212 as not having any fault. The present disclosure is, however, not limited to such an embodiment. The switching section 160 may output the second signal TS2 as the torque signal Td, instead of the first signal TS1. Also, the switching section 160 may output the fourth signal TS4 as the torque signal Td, instead of the third signal TS3 output from the third sensor 213, in response to the diagnosis section 140 diagnosing the third and fourth sensors 213, 214 as not having any fault.

In the first embodiment described above, the detection device 200 includes the four sensors 210 of the first to fourth sensors 211-214. The present disclosure is, however, not limited to such an embodiment. The detection device may include five or more sensors 210. In such a configuration, too, the periodicity with which the sensors 210 other than the first and second sensors 211, 212 output the signals TS is preferably longer than the first periodicity with which the first and second sensors 211, 212 output the signals TS.

Second Embodiment

Figure 4:
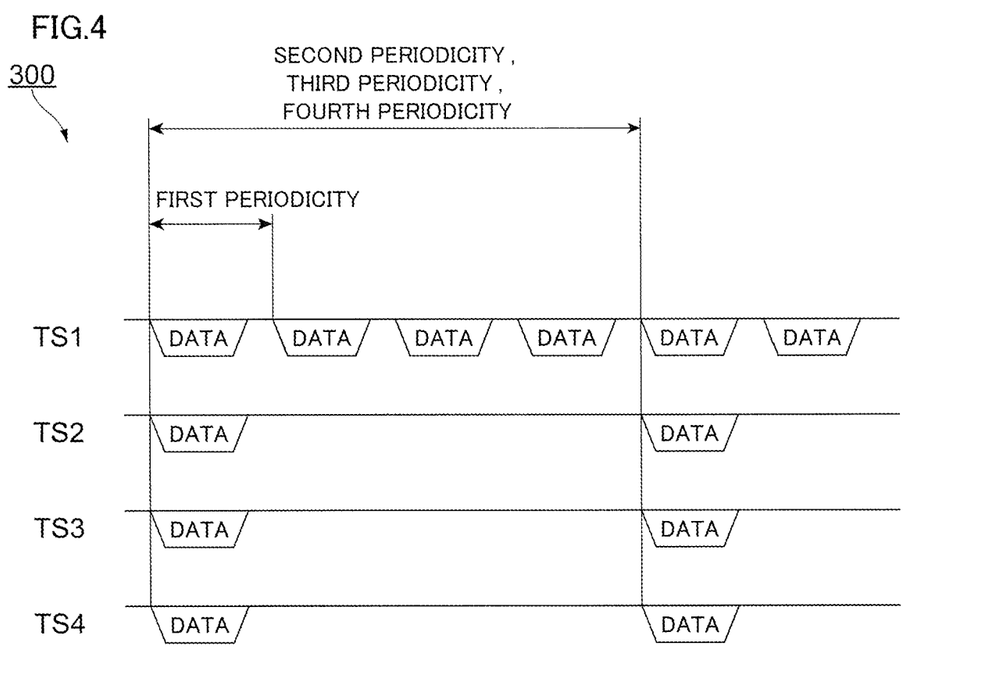
FIG. 4 illustrates examples of the first periodicity, the second periodicity, the third periodicity, and the fourth periodicity for a detection device according to a second embodiment.

FIG. 4 illustrates examples of the first periodicity, the second periodicity, the third periodicity, and the fourth periodicity for a detection device 300 according to the second embodiment.

The detection device 300 according to the second embodiment differs from the detection device 200 according to the first embodiment in the second periodicity with which the second sensor 212 outputs the second signal TS2. The following discussion focuses on differences between the detection device 200 and the detection device 300, and descriptions of similar aspects will be omitted.

The second periodicity for the detection device 300 is the same as the third and fourth periodicities, so that the second periodicity is longer than the first periodicity.

Accordingly, the diagnosis section 140 according to the second embodiment acquires the first signal TS1 with the first periodicity and acquires the second signal TS2 with the second periodicity longer than the first periodicity. The diagnosis section 140 diagnoses the health of the first and second sensors 211, 212 with the second periodicity with which the first and second signal TS1, TS2 are acquired.

As described above, for the detection device 300, the first periodicity with which the first signal TS1 is output from the first sensor 211, which is an example of one or some sensors, of the first to fourth sensors 211-214 is shorter than the periodicity (e.g., the third periodicity) with which the signals TS are output from the second to fourth sensors 212-214, which are examples of other sensors, of the first to fourth sensors 211-214.

The thus configured detection device 300 reduces the processing load on the controller 100 as compared to when the first to fourth periodicities are all set to have the same duration as the first periodicity and the controller 100 diagnoses the health of the first and second sensors 211, 212 as well as the health of the third and fourth sensors 213, 214 with the first periodicity.

Such a configuration still allows for control of actuation of the electric motor 20 using the third signal TS3 from the third sensor 213 even in the event of any fault in the first sensor 211 or the second sensor 212. Thus, the above configuration does not compromise the safety of the steering device 1.

The processing section 110 of the detection device 300 diagnoses the health of the first and second sensors 211, 212 using the first signal TS1 from the first sensor 211, which is an example of one sensor, and using the second signal TS2 from the second sensor 212, which is an example of the certain sensor, of the second to fourth sensors 212-214. The processing section 110 outputs the first signal TS1 from the first sensor 211 as the torque signal Td, which is an example of the signal indicative of the torque to be detected, in response to the diagnosis section 140 diagnosing the first and second sensors 211, 212 as being normal. Accordingly, the detection device 300 can further reduce the processing load on the controller 100 compared to the detection device 200.

Third Embodiment

Figure 5:
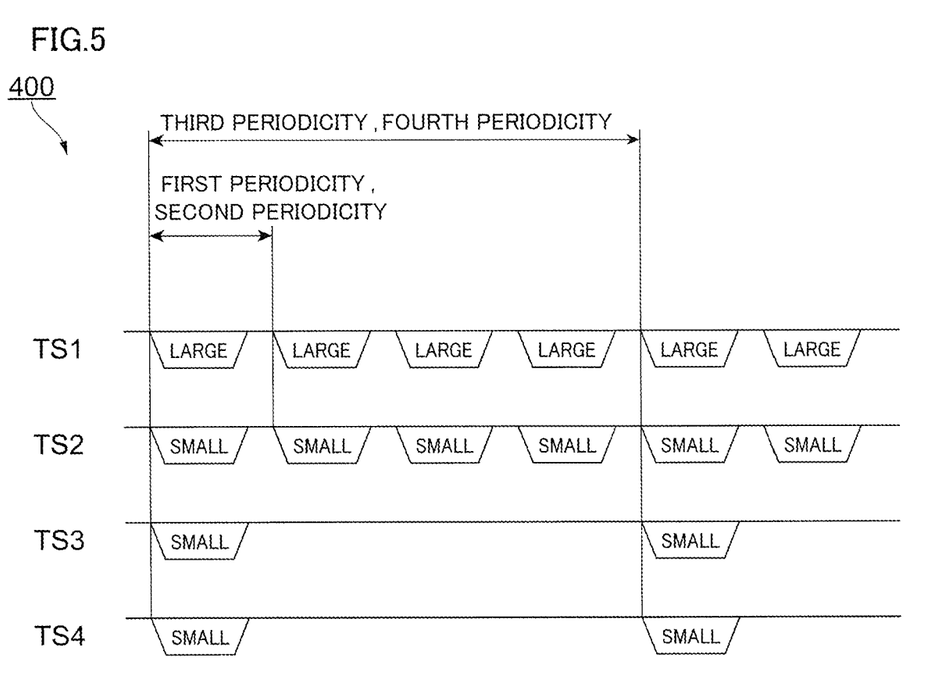
FIG. 5 illustrates examples of the first periodicity, the second periodicity, the third periodicity, and the fourth periodicity and an amount of information transmitted in a first signal TS1, a second signal TS2, a third signal TS3, and a fourth signal TS4 for a detection device according to a third embodiment.

FIG. 5 illustrates examples of the first periodicity, the second periodicity, the third periodicity, and the fourth periodicity and an amount of information transmitted in the first signal TS1, the second signal TS2, the third signal TS3, and the fourth signal TS4 for a detection device 400 according to the third embodiment.

The detection device 400 according to the third embodiment differs from the detection device 200 according to the first embodiment in that the amount of information transmitted in the first signal TS1, the second signal TS2, the third signal TS3, and the fourth signal TS4 is not identical. The following discussion focuses on differences between the detection device 200 and the detection device 400, and descriptions of similar aspects will be omitted.

For the detection device 400, the amount of information transmitted in the second signal TS2, the third signal TS3, and the fourth signal TS4 is smaller than the amount of information transmitted in the first signal TS1. By way of example, when the amount of information transmitted in the first signal TS1 is 16 bits, the amount of information transmitted in the second signal TS2, the third signal TS3, and the fourth signal TS4 may be 15 bits or less.

The amount of information transmitted in the second signal TS2, the third signal TS3, and the fourth signal TS4 is smaller than the amount of information transmitted in the first signal TS1, so that the amount of information to be analyzed by the diagnosis section 140 is reduced as compared to when all of the first to fourth signals TS1-TS4 transmit the same amount of information. This reduces the processing load on the controller 100.

For the amount of information transmitted in the second signal TS2, one preferably selects the number of bits of information that is sufficient for the diagnosis section 140 to diagnose a fault in the first and second sensors 211, 212. Also, for the amount of information transmitted in the third and fourth signals TS3, TS4, one preferably selects the number of bits of information that is sufficient for the diagnosis section 140 to diagnose a fault in the third and fourth sensors 213, 214.

Also, one preferably selects the amount of information transmitted in the third and fourth signals TS3, TS4 so that the actuation of the electric motor 20 can be controlled using the third signal TS3 so as to avoid any effect on normal steering even in an emergency situation where the first sensor 211 or the second sensor 212 is having a fault.

In the third embodiment described above, the amount of information transmitted in the second signal TS2 is also smaller than the amount of information transmitted in the first signal TS1. The present disclosure is, however, not limited to such an embodiment. For example, the amount of information transmitted in the second signal TS2 may be the same as the amount of information transmitted in the first signal TS1. Such an alternative embodiment also reduces the processing load on the controller 100 because the amount of information to be analyzed by the diagnosis section 140 is reduced as compared to when all of the first to fourth signals TS1-TS4 transmit the same amount of information.

Fourth Embodiment

Figure 6:
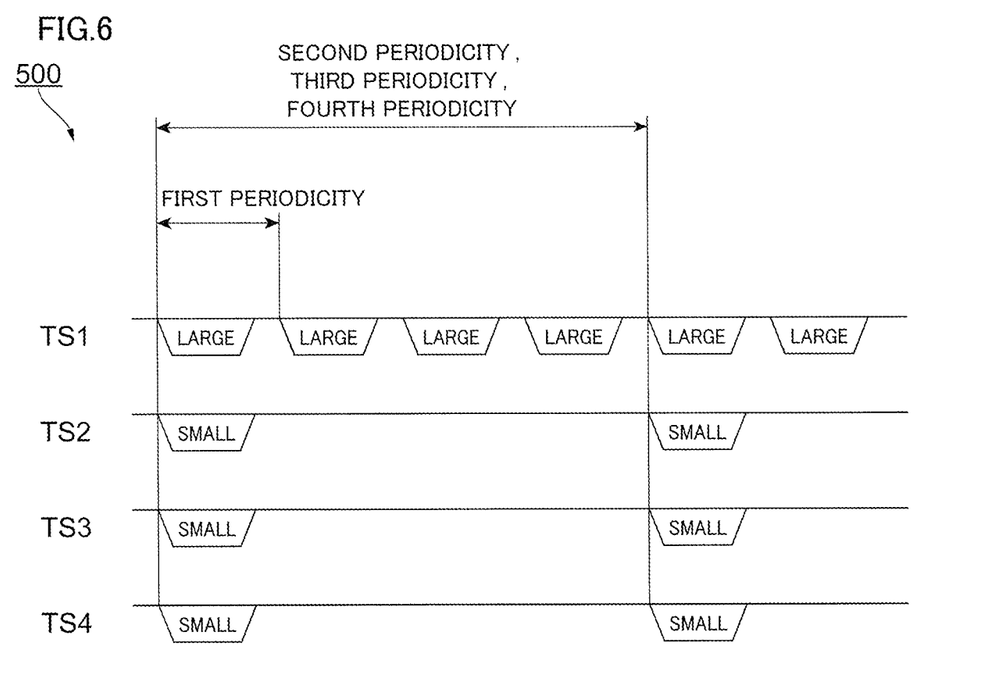
FIG. 6 illustrates examples of the first periodicity, the second periodicity, the third periodicity, and the fourth periodicity and an amount of information transmitted in the first signal, the second signal, the third signal, and the fourth signal for a detection device according to a fourth embodiment.

FIG. 6 illustrates examples of the first periodicity, the second periodicity, the third periodicity, and the fourth periodicity and an amount of information transmitted in the first signal TS1, the second signal TS2, the third signal TS3, and the fourth signal TS4 for a detection device 500 according to the fourth embodiment.

The detection device 500 according to the fourth embodiment differs from the detection device 300 according to the second embodiment in that the amount of information transmitted in the first signal TS1, the second signal TS2, the third signal TS3, and the fourth signal TS4 is not identical. The following discussion focuses on differences between the detection device 300 and the detection device 500, and descriptions of similar aspects will be omitted.

For the detection device 500, the amount of information transmitted in the second signal TS2, the third signal TS3, and the fourth signal TS4 is smaller than the amount of information transmitted in the first signal TS1. By way of example, when the amount of information transmitted in the first signal TS1 is 16 bits, the amount of information transmitted in the second signal TS2, the third signal TS3, and the fourth signal TS4 may be 12 bits.

The amount of information transmitted in the second signal TS2, the third signal TS3, and the fourth signal TS4 is smaller than the amount of information transmitted in the first signal TS1, so that the amount of information to be analyzed by the diagnosis section 140 is reduced as compared to when all of the first to fourth signals TS1-TS4 transmit the same amount of information. This reduces the processing load on the controller 100.

For the amount of information transmitted in the second signal TS2, one preferably selects the number of bits of information that is sufficient for the diagnosis section 140 to diagnose a fault in the first and second sensors 211, 212. Also, for the amount of information transmitted in the third and fourth signals TS3, TS4, one preferably selects the number of bits of information that is sufficient for the diagnosis section 140 to diagnose a fault in the third and fourth sensors 213, 214.

Also, one preferably selects the amount of information transmitted in the third and fourth signals TS3, TS4 so that the actuation of the electric motor 20 can be controlled using the third signal TS3 so as to avoid any effect on normal steering even in an emergency situation where the first sensor 211 or the second sensor 212 is having a fault.

In the fourth embodiment described above, the amount of information transmitted in the second signal TS2 is also smaller than the amount of information transmitted in the first signal TS1. The present disclosure is, however, not limited to such an embodiment. For example, the amount of information transmitted in the second signal TS2 may be the same as the amount of information transmitted in the first signal TS1. Such an alternative embodiment also reduces the processing load on the controller 100 because the amount of information to be analyzed by the diagnosis section 140 is reduced as compared to when all of the first to fourth signals TS1-TS4 transmit the same amount of information.

Fifth Embodiment

Figure 7:
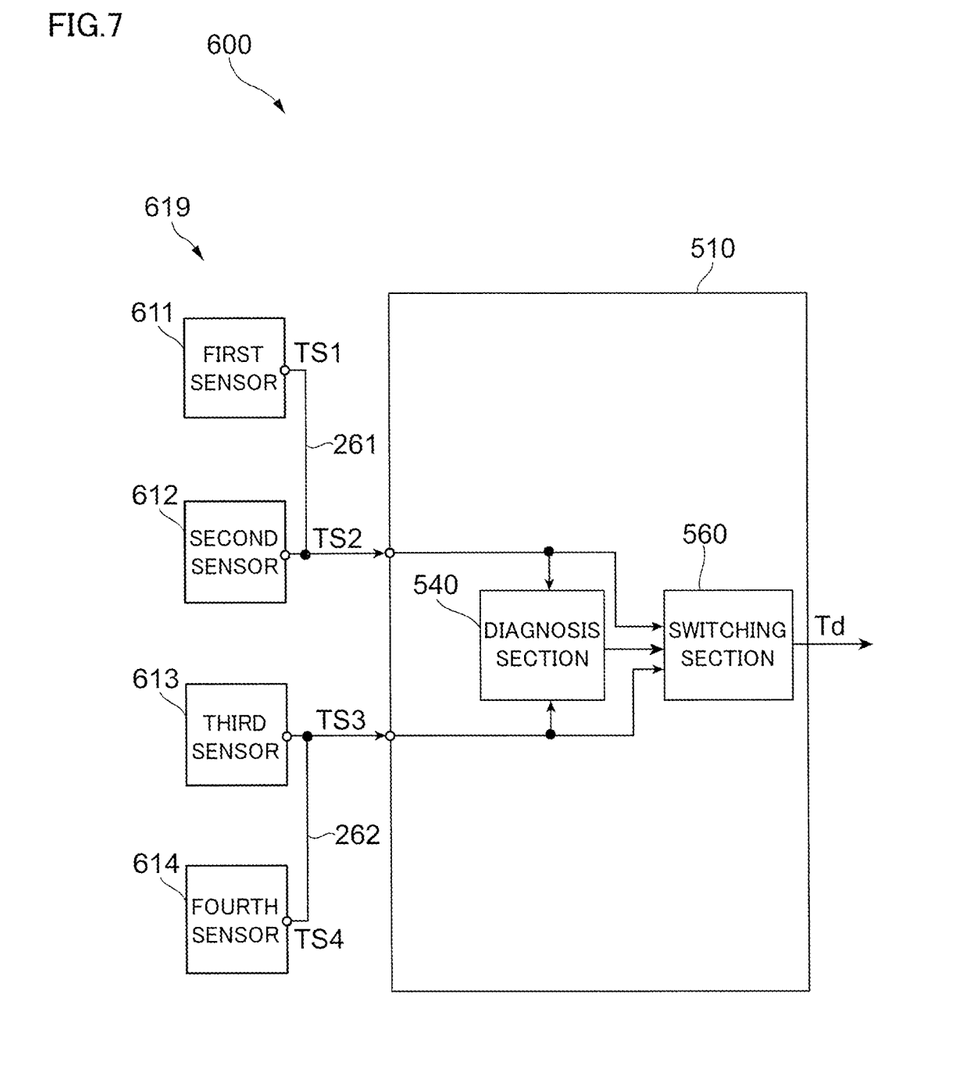
FIG. 7 illustrates an example schematic configuration of a detection device according to a fifth embodiment.

FIG. 7 illustrates an example schematic configuration of a detection device 600 according to the fifth embodiment.

Figure 8:
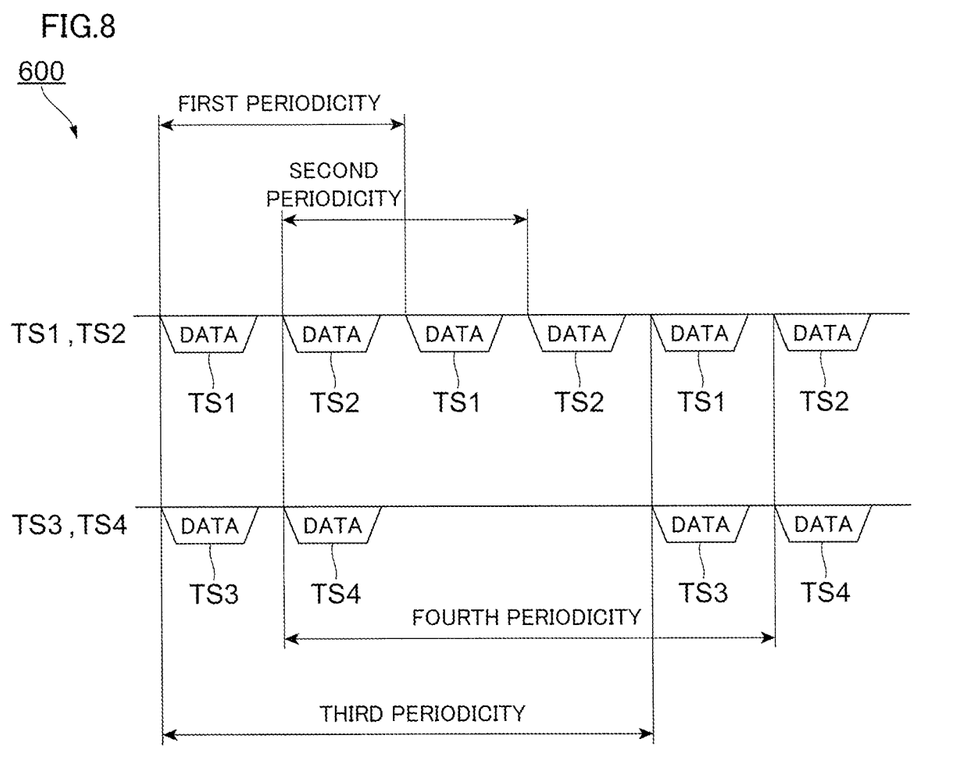
FIG. 8 illustrates examples of the first periodicity, the second periodicity, the third periodicity, and the fourth periodicity and an amount of information transmitted in the first signal, the second signal, the third signal, and the fourth signal for the detection device according to the fifth embodiment.

FIG. 8 illustrates examples of the first periodicity, the second periodicity, the third periodicity, and the fourth periodicity and an amount of information transmitted in the first signal TS1, the second signal TS2, the third signal TS3, and the fourth signal TS4 for the detection device 600 according to the fifth embodiment.

The detection device 600 according to the fifth embodiment differs from the detection device 200 according to the first embodiment in that the first and second signals TS1, TS2 are transmitted via the same communication line 261, and the third and fourth signals TS3, TS4 are transmitted via the same communication line 262. The following discussion focuses on differences between the detection device 200 and the detection device 600, and descriptions of similar aspects will be omitted.

The detection device 600 includes a sensor unit 619 and a processing section 510 corresponding to the processing section 110.

The sensor unit 619 includes a first sensor 611, a second sensor 612, a third sensor 613, and a fourth sensor 614. Hereinafter, the first sensor 611, the second sensor 612, the third sensor 613, and the fourth sensor 614 may be collectively referred to as sensors 610 unless the distinction is needed.

The first and second sensors 611, 612 of the detection device 600 sequentially transmit their respective detection signals, i.e., the first and second signals TS1, TS2 to the processing section 510 via the communication line 261. More specifically, upon receipt of an instruction signal from the processing section 510, the first sensor 611 first transmits the first signal TS1, and then the second sensor 612 transmits the second signal TS2, both via the communication line 261.

Also, the third and fourth sensors 613, 614 of the detection device 600 sequentially transmit their respective detection signals, i.e., the third and fourth signals TS3, TS4 to the processing section 510 via the communication line 262. More specifically, upon receipt of an instruction signal from the processing section 510, the third sensor 613 first transmits the third signal TS3, and then the fourth sensor 614 transmits the fourth signal TS4, both via the communication line 262.

For the detection device 600 according to the fifth embodiment, the first and second periodicities are the same, and the third and fourth periodicities are the same and longer than the first and second periodicities. By way of example, the third and fourth periodicities may be an integer multiple of the first and second periodicities. For example, when the first and second periodicities are each 1 msec, the third and fourth periodicities may be each 2 msecs, 3 msecs, 4 msecs, or 5 msecs.

The processing section 510 includes a diagnosis section 540 to diagnose a fault in the first sensor 611, the second sensor 612, the third sensor 613, and the fourth sensor 614. The processing section 510 further includes a switching section 560.

After sequentially receiving the first and second signals TS1, TS2 via the communication line 261, the diagnosis section 540 diagnoses the health of the first and second sensors 611, 612. Also, after sequentially receiving the third and fourth signals TS3, TS4 via the communication line 262, the diagnosis section 540 diagnoses the health of the third and fourth sensors 613, 614.

The thus configured detection device 600 reduces the processing load on the diagnosis section 540 as compared to when the first to fourth periodicities are all set to have the same duration as the first periodicity and the diagnosis section 540 diagnoses the health of the first and second sensors 611, 612 as well as the health of the third and fourth sensors 613, 614 with the first periodicity.

Such a configuration still allows for control of actuation of the electric motor 20 using the third signal TS3 from the third sensor 613 even in the event of any fault in the first sensor 611 or the second sensor 612. Thus, the above configuration does not compromise the safety.

Sixth Embodiment

Figure 9:
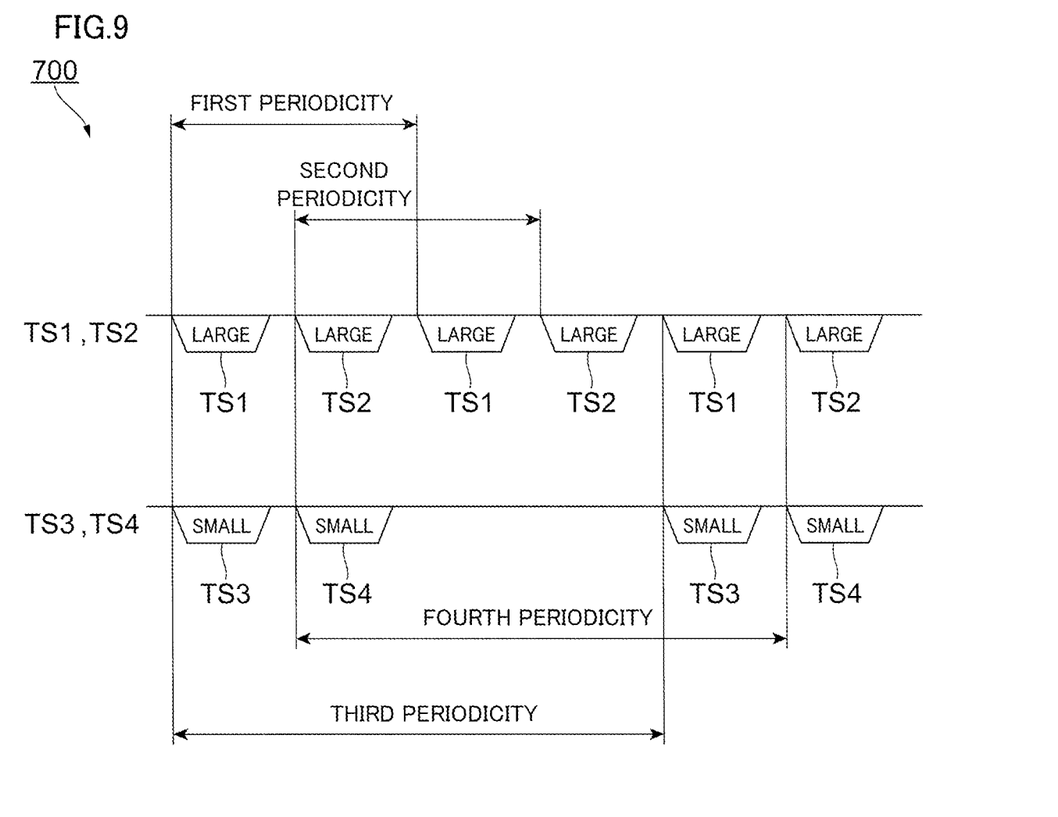
FIG. 9 illustrates examples of the first periodicity, the second periodicity, the third periodicity, and the fourth periodicity and an amount of information transmitted in the first signal, the second signal, the third signal, and the fourth signal for a detection device according to a sixth embodiment.

FIG. 9 illustrates examples of the first periodicity, the second periodicity, the third periodicity, and the fourth periodicity and an amount of information transmitted in the first signal TS1, the second signal TS2, the third signal TS3, and the fourth signal TS4 for a detection device 700 according to the sixth embodiment.

The detection device 700 according to the sixth embodiment differs from the detection device 600 according to the fifth embodiment in that the amount of information transmitted in the first signal TS1, the second signal TS2, the third signal TS3, and the fourth signal TS4 is not identical. The following discussion focuses on differences between the detection device 600 and the detection device 700, and descriptions of similar aspects will be omitted.

For the detection device 700, the amount of information transmitted in the third and fourth signals TS3, TS4 is smaller than the amount of information transmitted in the first and second signals TS1, TS2. By way of example, when the amount of information transmitted in the first and second signals TS1, TS2 is 16 bits, the amount of information transmitted in the third and fourth signals TS3, TS4 may be 12 bits.

The amount of information transmitted in the third and fourth signals TS3, TS4 is smaller than the amount of information transmitted in the first and second signals TS1, TS2, so that the amount of information to be analyzed by the diagnosis section 540 is reduced as compared to when all of the first to fourth signals TS1-TS4 transmit the same amount of information. This reduces the processing load on the diagnosis section 540.

For the amount of information transmitted in the third and fourth signals TS3, TS4, one preferably selects the number of bits of information that is sufficient for the diagnosis section 540 to diagnose the health of the third and fourth sensors 613, 614.

Also, one preferably selects the amount of information transmitted in the third and fourth signals TS3, TS4 so that the actuation of the electric motor 20 can be controlled using the third signal TS3 so as to avoid any effect on normal steering even in an emergency situation where the first sensor 611 or the second sensor 612 is having a fault.

Seventh Embodiment

Figure 10:
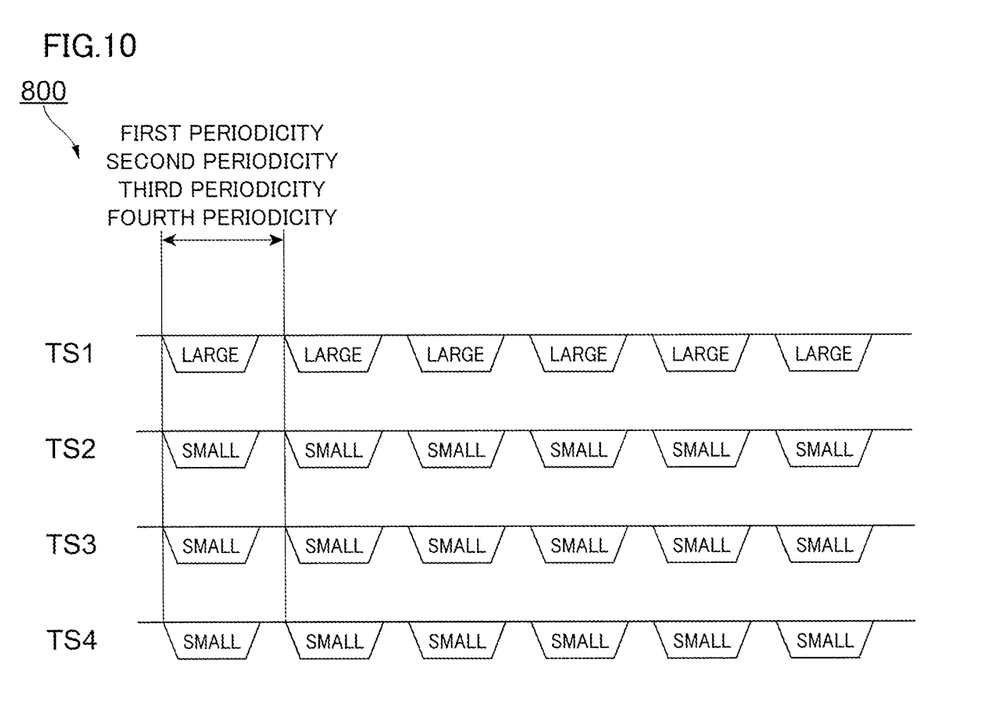
FIG. 10 illustrates examples of the first periodicity, the second periodicity, the third periodicity, and the fourth periodicity and an amount of information transmitted in the first signal, the second signal, the third signal, and the fourth signal for a detection device according to a seventh embodiment.

FIG. 10 illustrates examples of the first periodicity, the second periodicity, the third periodicity, and the fourth periodicity and an amount of information transmitted in the first signal TS1, the second signal TS2, the third signal TS3, and the fourth signal TS4 for a detection device 800 according to the seventh embodiment.

The detection device 800 according to the seventh embodiment differs from the detection device 200 according to the first embodiment in that different second to fourth periodicities are employed and that the amount of information transmitted in the first signal TS1, the second signal TS2, the third signal TS3, and the fourth signal TS4 is not identical. The following discussion focuses on differences between the detection device 200 and the detection device 800, and descriptions of similar aspects will be omitted.

The second to fourth periodicities for the detection device 800 are set to have the same duration as the first periodicity.

Meanwhile, for the detection device 800, the amount of information transmitted in the second signal TS2, the third signal TS3, and the fourth signal TS4 is smaller than the amount of information transmitted in the first signal TS1. By way of example, when the amount of information transmitted in the first signal TS1 is 16 bits, the amount of information transmitted in the second signal TS2, the third signal TS3, and the fourth signal TS4 may be 12 bits.

As described above, for the detection device 800, the amount of information transmitted in the first signal TS1 from the first sensor 211, which is an example of one or some sensors, of the first to fourth sensors 211-214 is larger than the amount of information transmitted in the signals TS from the second to fourth sensors 212-214, which are examples of other sensors, of the first to fourth sensors 211-214.

Although all of the first to fourth periodicities have the same duration, the amount of information transmitted in the second to fourth signals TS2-TS4 is smaller than the amount of information transmitted in the first signal TS1 for the detection device 800, so that the amount of information to be analyzed by the diagnosis section 140 is reduced as compared to when all of the first to fourth signals TS1-TS4 transmit the same amount of information. As a result, the processing load on the controller 100 is reduced.

For the amount of information transmitted in the second signal TS2, one preferably selects the number of bits of information that is sufficient for the diagnosis section 140 to diagnose the health of the first and second sensors 211, 212. Also, for the amount of information transmitted in the third and fourth signals TS3, TS4, one preferably selects the number of bits of information that is sufficient for the diagnosis section 140 to diagnose the health of the third and fourth sensors 213, 214.

Also, one preferably selects the amount of information transmitted in the third and fourth signals TS3, TS4 so that the actuation of the electric motor 20 can be controlled using the third signal TS3 so as to avoid any effect on normal steering even in an emergency situation where the first sensor 211 or the second sensor 212 is having a fault.

In the seventh embodiment described above, the amount of information transmitted in the second signal TS2 is also smaller than the amount of information transmitted in the first signal TS1. The present disclosure is, however, not limited to such an embodiment. For example, the amount of information transmitted in the second signal TS2 may be the same as the amount of information transmitted in the first signal TS1. Such an alternative embodiment also reduces the processing load on the diagnosis section 140 because the amount of information to be analyzed by the diagnosis section 140 is reduced as compared to when all of the first to fourth signals TS1-TS4 transmit the same amount of information.

REFERENCE SIGNS LIST

1 Electric power steering device
100 Controller
110 Processing section
140 Diagnosis section
160 Switching section
170 Control section
200 Detection device
211 First sensor
212 Second sensor
213 Third sensor
214 Fourth sensor

The invention claimed is:

1. A detection device comprising:
a plurality of sensors configured to detect a value to be detected; and
a controller configured to process a detection signal output from each of the plurality of sensors, wherein
the plurality of sensors include a first sensor, a second sensor, a third sensor, and a fourth sensor,
a time periodicity with which the first sensor and the second sensor output detection signals is shorter than a time periodicity with which the third sensor and the fourth sensor output detection signals,
the controller is configured to diagnose a fault in the first sensor, the second sensor, the third sensor, and the fourth sensor and to switch between using a first signal and using a third signal as a torque signal, the first signal being a detection signal output from the first sensor, the third signal being a detection signal output from the third sensor,
the controller is configured to use the first signal and a second signal, the second signal being a detection signal output from the second sensor, to diagnose whether the first sensor and the second sensor are normal or the first sensor or the second sensor is having a fault,
the controller is configured to use the third signal and a fourth signal, the fourth signal being a detection signal output from the fourth sensor, to diagnose whether the third sensor and the fourth sensor are normal or the third sensor or the fourth sensor is having a fault,
in response to a diagnosis of the first sensor and the second sensor as not having a fault, the controller is configured to output the first signal as a torque signal, and
in response to a diagnosis of the first sensor or the second sensor as having a fault and a diagnosis of the third sensor and the fourth sensor as not having a fault, the controller is configured to output the third signal as a torque signal.

2. A detection device comprising:
a plurality of sensors configured to detect a value to be detected; and
a controller configured to process a detection signal output from each of the plurality of sensors, wherein
the plurality of sensors include a first sensor, a second sensor, a third sensor, and a fourth sensor,
a time periodicity with which the first sensor outputs a detection signal is shorter than a time periodicity with which the second sensor, the third sensor, and the fourth sensor output detection signals,
the controller is configured to diagnose a fault in the first sensor, the second sensor, the third sensor, and the fourth sensor and to switch between using a first signal and using a third signal as a torque signal, the first signal being a detection signal output from the first sensor, the third signal being a detection signal output from the third sensor,
the controller is configured to use the first signal and a second signal, the second signal being a detection signal output from the second sensor, to diagnose whether the first sensor and the second sensor are normal or the first sensor or the second sensor is having a fault,
the controller is configured to use the third signal and a fourth signal, the fourth signal being a detection signal output from the fourth sensor, to diagnose whether the third sensor and the fourth sensor are normal or the third sensor or the fourth sensor is having a fault,
in response to a diagnosis of the first sensor and the second sensor as not having a fault, the controller is configured to output the first signal as a torque signal, and
in response to a diagnosis of the first sensor or the second sensor as having a fault and a diagnosis of the third sensor and the fourth sensor as not having a fault, the controller is configured to output the third signal as a torque signal.

3. A steering device comprising:
a detection device according to claim 1, wherein
the controller is configured to control actuation of an electric motor using values detected by the detection device.

4. A steering device comprising:
a detection device according to claim 2, wherein
the controller is configured to control actuation of an electric motor using values detected by the detection device.

* * * * *